(12) United States Patent
Chiapuzzi

(10) Patent No.: US 8,040,130 B2
(45) Date of Patent: Oct. 18, 2011

(54) DEVICE FOR DETECTING THE TORQUE AND THE ANGLE OF ROTATION OF A ROTATING SHAFT

(75) Inventor: Angelo Chiapuzzi, Milan (IT)

(73) Assignee: Atlas Copco BLM S.r.l, Paderno Dugnano, Milan (IT)

( * ) Notice: Subject to any disclaimer, the term of this patent is extended or adjusted under 35 U.S.C. 154(b) by 170 days.

(21) Appl. No.: 12/448,888

(22) PCT Filed: Jan. 15, 2008

(86) PCT No.: PCT/EP2008/000256
§ 371 (c)(1),
(2), (4) Date: Jul. 13, 2009

(87) PCT Pub. No.: WO2008/087007
PCT Pub. Date: Jul. 24, 2008

(65) Prior Publication Data
US 2010/0116067 A1  May 13, 2010

(30) Foreign Application Priority Data
Jan. 19, 2007 (IT) .............................. MI2007A0072

(51) Int. Cl.
*G01B 7/30* (2006.01)
*G01L 3/00* (2006.01)
(52) U.S. Cl. ........... 324/207.25; 324/207.2; 73/862.325; 73/862.331
(58) Field of Classification Search ........ 324/207.21–207.25; 73/862.325–862.339; 81/467, 480
See application file for complete search history.

(56) References Cited

U.S. PATENT DOCUMENTS

| 4,648,282 | A | * | 3/1987 | Alender et al. ............ 73/862.23 |
| 4,741,217 | A | | 5/1988 | Morgan |
| 4,757,721 | A | * | 7/1988 | Horner et al. ............ 73/862.338 |
| 4,898,258 | A | | 2/1990 | Ohe et al. |
| 5,557,975 | A | * | 9/1996 | Crane et al. ............. 73/862.338 |

(Continued)

FOREIGN PATENT DOCUMENTS

DE      198 35 694 A1    2/2000

(Continued)

OTHER PUBLICATIONS

PCT Search Report dated Apr. 29, 2008.

(Continued)

*Primary Examiner* — Lisa Caputo
*Assistant Examiner* — Jonathan Dunlap
(74) *Attorney, Agent, or Firm* — Hedman & Costigan, P.C.; James V. Costigan

(57) ABSTRACT

A device for detecting torque features of an electric screwer comprises a clutch for coupling with the electric screwer and a clutch for applying a resisting torque. The two clutches (11, 13) are connected to one another by a shaft (14) on which there are arranged extensometers (15) for measuring the torque transmitted by the shaft. On the shaft there is splined a disc (18) that bears on at least one face circular tracks (19, 20, 21, 22) that are coaxial to the shaft and to which the extensometers are electrically connected. Sliding contacts (23, 24, 25, 26) rest elastically on said circular tracks in a direction that is substantially parallel to the axis of the shaft to pick up the electric signals from the extensometers. An encoder (17) is provided to detect shaft rotation.

9 Claims, 1 Drawing Sheet

U.S. PATENT DOCUMENTS

| | | | | |
|---|---|---|---|---|
| 5,838,222 A * | 11/1998 | Al-Rawi | ............... | 338/198 |
| 5,886,246 A * | 3/1999 | Bareggi et al. | ............... | 73/1.09 |
| 6,747,448 B2 * | 6/2004 | Berndt | ............... | 324/207.15 |
| 6,864,681 B1 * | 3/2005 | Horner et al. | ............... | 324/207.25 |
| 6,894,487 B2 * | 5/2005 | Kunz-Vizenetz | ............... | 324/207.25 |
| 6,945,126 B2 * | 9/2005 | Toratani et al. | ............... | 73/862.08 |
| 7,021,180 B2 * | 4/2006 | Crane | ............... | 81/467 |
| 7,285,952 B1 * | 10/2007 | Hatanaka et al. | ............... | 324/207.25 |
| 7,677,122 B2 * | 3/2010 | Kim | ............... | 73/865.9 |
| 7,726,208 B2 * | 6/2010 | Hoeller et al. | ............... | 73/862.331 |
| 2003/0177649 A1 * | 9/2003 | Ito et al. | ............... | 33/1 PT |
| 2004/0032255 A1 * | 2/2004 | Berndt | ............... | 324/207.25 |
| 2004/0182174 A1 | 9/2004 | Toratani | | |

FOREIGN PATENT DOCUMENTS

| | | |
|---|---|---|
| EP | 0 164 574 A | 12/1985 |
| EP | 0 232 606 A | 8/1987 |
| WO | WO01/40750 A | 6/2001 |

OTHER PUBLICATIONS

Crowle T.B. et al..A Compact Torque Meter, J. Hysics E. Sci . Instruments, Institute of Physics Publishing ,V. 21, No. 12.,1159-1162 Dec. 1, 1988.

Josef Hanisch, Was Sie Schon Immer Ober Hallsensoren Wissden Wollten, Elektronik Industrie, V. 7, 2006, pp. 2-5.

* cited by examiner

DEVICE FOR DETECTING THE TORQUE AND THE ANGLE OF ROTATION OF A ROTATING SHAFT

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-By-REFERENCE OF MATERIAL SUBMITTED ON A COMPACT DISK

Not Applicable

REFERENCE TO A MICROFICHE APPENDIX

Not Applicable

BACKGROUND OF THE INVENTION

1. Field of the Invention

This invention relates to an innovative sensor device for detecting the torque features of a driven electric screwer.

2. Description of Related Art

In the field of electric screwers sensor devices are well known for detecting the torque features of the electric screwer. Such devices are connected to the outlet of the electric screwer and normally comprise a current torque sensor and a rotation angle sensor the measuring of which, as is known, enables the suitable performance curves of the electric screwer to be plotted.

The torque sensor is made of a metal shaft that transmits the torque of the electric screwer and on which an extensometer is fixed, for example of resistive type. The angle sensor is formed by an encoder connected mechanically to the shaft.

In order to make the signal from the extensometer that rotates with the shaft reach the measuring and processing electronics sliding contacts are normally used that rest on suitable conductive rings arranged alongside one another on the peripheral surface of the rotating shaft.

A drawback of known devices is in the devising the encoder function. In fact, using a mechanical encoder introduces dragging torque that falsifies the measuring of the extensometers. In order to overcome the drawback, optical encoders have been suggested. Optical encoders, however, suffer from the effect of dust and other impurities. A large source of dust is in the sliding contacts of the extensometers.

A typical drawback of sliding contacts is that they produce dust (especially in the case of sliding surfaces made of graphite) because of the continuous sliding of the contacts. In the case of detecting devices for detecting the torque features of electric screwers, the dust produced by the contacts of the torque sensor may disturb the operation of the detecting encoder for detecting optical angular rotation. It is therefore generally necessary to use seal washers that insulate the containing chamber containing the sliding contacts on the side of the device containing the encoder. Such washers in turn cause friction that is additional to the rotation of the measuring shaft. Further, over time the washers harden, worsening shaft rotation friction, and thus losing the dustproof function.

A general object of the present invention is to overcome the drawbacks of the prior art by providing a detecting device for detecting torque features of an electric screwer that is insensitive to dust in a satisfactory manner and which enables the detecting errors of the torque sensors arising from friction between the supporting shaft of the extensometers and the encoder to be minimized.

Another drawback of the known sensors of the type mentioned above is that they have great electrical noise due to the jumps of the sliding contacts. On the other hand, the elastic force that pushes the contacts against the conductive rings cannot be increased to reduce the jumps, as this would have a consequent braking effect on the shaft that would disturb measuring. Especially if the friction introduced by the encoder is reduced, it becomes important to limit a braking action of the electrical contacts of the torque sensors.

A further object of the present invention is to overcome the aforesaid drawbacks by providing a device for detecting torque features of an electric screwer, that reduces the electrical noise caused by the sliding contacts, without having an unacceptable increase of the contact force.

A still further object is to have a device with reduced overall dimensions and improved inertia features.

BRIEF SUMMARY OF THE INVENTION

In view of such objects, it has been decided to make, according to the invention, a device for detecting torque features of an electric screwer comprising a clutch for coupling with the electric screwer and a clutch for applying a resisting torque, the two clutches being mutually connected by a shaft on which there are arranged extensometers for measuring the torque transmitted by the shaft, a rotating contact assembly providing the electrical connection to the extensometers that rotate with the shaft and an encoder being connected to the shaft to detect the angular rotation thereof, characterized in that the encoder comprises an electronic sensor with a Hall effect that detects the angular position of a facing magnet rotated by the shaft. Still according to the invention, it was also decided to make a device as mentioned above, characterized in that said contact assembly comprises at least a disc that is splined on the shaft and bears on at least one face circular tracks that are coaxial to the shaft and on which the extensometers are electrically connected, and sliding contacts that rest elastically on said circular tracks in a direction that is substantially parallel to the axis of the shaft.

DETAILED DESCRIPTION OF THE INVENTION

Figure 1:
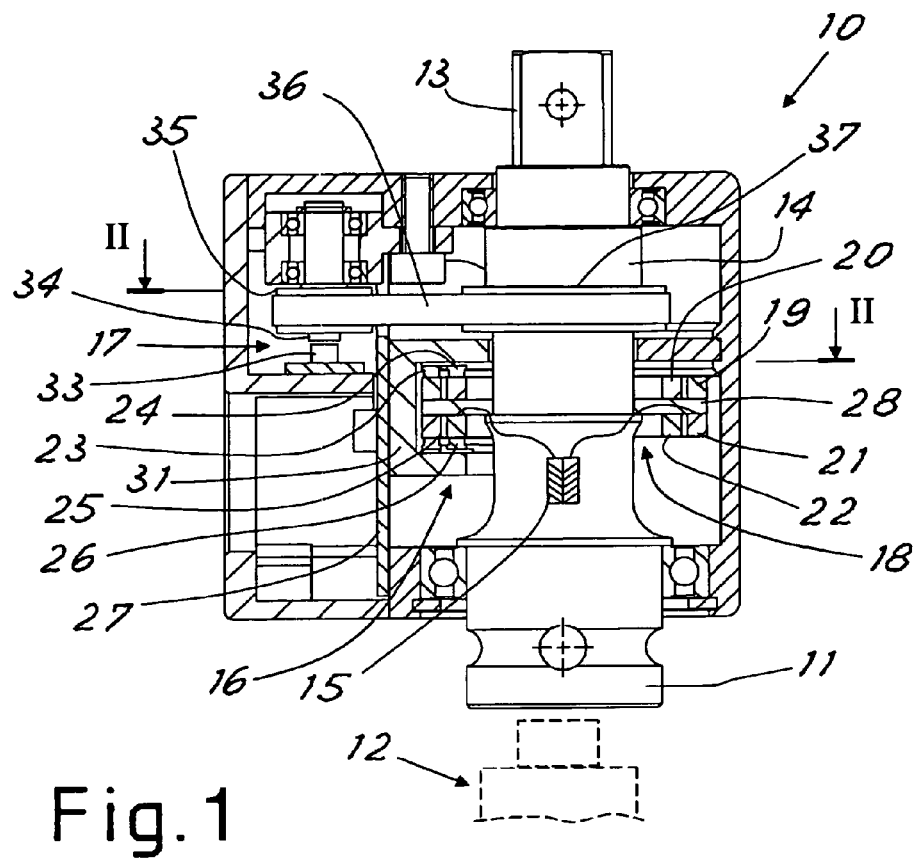
FIG. 1 is a longitudinal section view of the device according to the invention.

With reference to the figures, in FIG. 1 there is schematically shown a device for detecting torque features, indicated generally by 10, made according to the principles of the invention.

The device 10 comprises at one end a clutch 11 connecting to the power shaft of the electric screwer (schematically indicated by 12) and at the other end a clutch 13 for applying the real or simulated resisting torque of the screw.

In the device 10 the two clutches 11, 13 are stiffly connected by a shaft 14, on which there are arranged known extensometers 15 that measure the torque stress of the shaft and consequently, the torque transmitted thereby between the two clutches.

A rotating contact assembly 16 connects the extensometers 15 to the appropriate known electronics for processing signals. An encoder 17 provides a signal for measuring the angular rotation of the shaft and this is also connected to the appropriate known electronics for processing signals.

As can be seen in FIG. 1, in the device according to the invention the encoder 17 was advantageously made using a known electronic sensor 33 with a Hall effect of the type that detects the position or angular rotation of a facing magnet.

In front of the sensor there is positioned a magnet 34, glued axially on a pulley 35 connected by a belt 36 to a pulley 37 splined on the shaft 14. In this way there has been eliminated all influence of the dust and sealing washers can be completely avoided.

Innovatively, the contact assembly 16 comprises at least a disc 18 that is splined on the shaft 14 and carries concentric circular conductive tracks 19, 20, 21, 22 on the side faces thereof. The extensometers fixed on the shaft are electrically connected to the tracks. Corresponding sliding contacts 23, 24, 25, 26 rest elastically on the tracks from a direction that is substantially parallel to the axis of the shaft 14 and transmit the electric signals to the fixed electronics (shown partially and schematically by a printed circuit 27). Electronics can comprise a known pre-processing part of the signals that is arranged between the device 10 in order to then send the thus obtained signals to a connector (that is not shown). A connection cable is connected to the connector towards a known measuring and processing electronics that are not shown here as they are easily imaginable by those skilled in the art.

Advantageously, there are four circular tracks, for example for a known bridge connection of the extensometers, and the tracks are arranged in pairs on the opposite side faces of the disc 18, so as to maintain the diameter of the disc reduced and to contribute to having a reduced inertia moment. The support from opposite directions on the two faces of the disc also makes the axial thrust action of the contacts on the shaft substantially neutral. Also the length of the shaft 14 is reduced, improving the features of the device and reducing the overall dimensions thereof. Advantageously, the disc 18 can be made by packing several disc or ring elements axially to the shaft. In the shown embodiment there is an internal layer or disc 28 formed by a printed-circuit base with suitable conducting tracks 29 engraved thereupon to form a connection between connecting terminals 30 of the wires coming from the extensometers and the concentric tracks. On the two faces of the central printed circuit 28 concentric rings 19, 20, 21, 22 are packed that form the circular sliding tracks of the contacts. The rings can be advantageously obtained through mechanical processing by two discs in contact with the two faces of the central printed circuit, which are for example fixed by gluing, welding, riveting, etc.

Alternatively, also the circular tracks can be obtained by engraving from a printed circuit. The tracks can be made of graphite or of a suitable metal (for example copper) covered by graphite or by another conductive material and be sufficiently resistant to wear from sliding. Advantageously, the graphite rings can have a copper electrolytic deposit to facilitate soldering.

Figure 2:
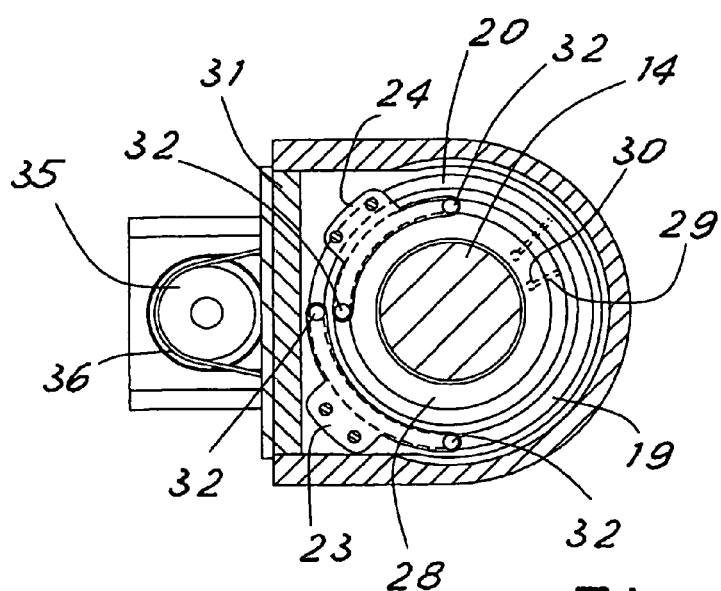
FIG. 2 is a section view taken along the line II-II of FIG. 1.

In FIG. 2 the two elastic elements are more visible that form the sliding electrical contacts in contact with the annular tracks on a side of the disc (on the other side of the disc the contacts are essentially specular for the other two tracks). These contacts are advantageously made from two elastic arms that protrude in opposite directions along the circumference of the ring tracks and are supported in an intermediate position by a supporting element 31. The end of each arm has a contact protrusion or ridge 32 that rests elastically on the respective ring track. This protrusion can be made by drawing the metal sheeting that forms the contact element and/or also by installing conducting material that has good electrical contact and wear-resistance properties. For example, they can be covered with graphite. As can be seen well in FIG. 1, the element 31 supporting the contacts is advantageously U-shaped to grasp the disc. It has been found that with a rotating contact structure as disclosed high performance is obtained in the specific use of a measuring device for measuring the torque features of electric screwers. This has been found to depend on the fact that in applications with electric screwers the vibrations transmitted on the shaft are prevalently transverse to the axis of the shaft. With contacts having a rest direction substantially parallel to the axis of the shaft the jumps are thus minimized that occur in prior-art devices, without any need to increase the elastic thrust of the contacts against the tracks.

In the case of the device according to the invention, the reduced sliding resistance (that is possible as other contact forces are not necessary to avoid jumps) is particularly useful with the encoder of the invention that enables the introduction of additional friction to be avoided.

At this point it is clear how the preset objects have been achieved, providing a sensor device for detecting the torque features of electric screwers that is tough, compact and high-performance. This device may be, for example, easily integrated into test benches for electric screwers that is interposed between a known simulation device for simulating the resistance torque of a screw being tightened and a suitable clutch for the electric screwer to be tested. Naturally, the above description of an embodiment applying the innovative principles of the present invention is provided by way of example of such innovative principles and must not therefore be taken to limit the scope of what is claimed herein. For example, the dimensions and proportions of the various parts may vary according to the specific practical and applicational needs. Disc elements that are axially spaced on the shaft to reduce the diameter or to increase the number of circular contact tracks may also be provided.

The invention claimed is:

1. Device for detecting torque features of an electric screwer comprising a clutch for coupling with the electric screwer and a clutch for applying a resisting torque, the two clutches (11, 13) being mutually connected by a shaft (14) on which there are arranged extensometers (15) for measuring the torque transmitted by the shaft, a rotating contact assembly (16) providing an electrical connection to the extensometers that rotate with the shaft and an encoder being connected to the shaft to detect the angular rotation thereof, characterized in that the encoder comprises an electronic sensor (33) with a Hall effect that detects the angular position of a facing magnet (34) rotated by the shaft wherein the magnet (34) is fixed axially on a pulley (35) connected by a belt (36) to a pulley (37) splined on the shaft (14).

2. Device according to claim 1, characterized in that said contact assembly (16) comprises at least a disc (18) that is splined on the shaft and that bears on at least one face thereof circular tracks (19, 20, 21, 22) that are coaxial to the shaft and to which the extensometers are electrically connected, and sliding contacts (23, 24, 25, 26) that rest elastically on said circular tracks in a direction that is substantially parallel to the axis of the shaft.

3. Device according to claim 2, characterized in that the disc (18) has circular tracks (19, 20, 21, 22) on both faces thereof.

4. Device according to claim 3, characterized in that the tracks (19, 20, 21, 22) are two on each face of the disc.

5. Device according to claim 2, characterized in that the disc (18) is formed by several assembled layers, the innermost layer being a printed-circuit base (28) connecting conductors of the extensometers and the circular tracks (19, 20, 21, 22).

6. Device according to claim 5, characterized in that the circular tracks (19, 20, 21, 22) are formed by rings fixed on the two faces of the base (28) that forms the innermost layer.

7. Device according to claim 2, characterized in that the contact surface of the circular tracks (19, 20, 21, 22) is made of graphite.

8. Device according to claim 2, characterized in that the sliding contacts (23, 24, 25, 26) comprise two elastic arms suitably directed along the respective circular track, each arm terminating with a contact zone (32) on the track.

9. Device according to claim 8, characterized in that the contact zones (32) have a graphite contact surface.

\* \* \* \* \*